(12) United States Patent
Velte et al.

(10) Patent No.: US 12,004,273 B2
(45) Date of Patent: Jun. 4, 2024

(54) SELF-PROPELLED SENSING SYSTEM FOR GROW OPERATIONS

(71) Applicant: Verilytix Inc., Lake Elmo, MN (US)

(72) Inventors: Toby J. Velte, Lake Elmo, MN (US); Quinton J. Krueger, Lake Elmo, MN (US); Robert J. Barnes, Saint Michael, MN (US)

(73) Assignee: Verilytix Inc., Lake Elmo, MN (US)

( * ) Notice: Subject to any disclaimer, the term of this patent is extended or adjusted under 35 U.S.C. 154(b) by 0 days.

(21) Appl. No.: 18/052,685

(22) Filed: Nov. 4, 2022

(65) Prior Publication Data
US 2024/0155746 A1 May 9, 2024

(51) Int. Cl.
*H05B 45/12* (2020.01)
*A01G 7/04* (2006.01)
*H05B 45/18* (2020.01)

(52) U.S. Cl.
CPC ............. *H05B 45/12* (2020.01); *A01G 7/045* (2013.01); *H05B 45/18* (2020.01)

(58) Field of Classification Search
CPC ........ H05B 45/12; H05B 45/18; A01G 7/045; A01G 9/249; A01G 22/00; A01G 7/06; A01G 9/00; Y02P 60/14
See application file for complete search history.

(56) References Cited

U.S. PATENT DOCUMENTS

| | | | |
|---|---|---|---|
| 2015/0351325 A1* | 12/2015 | Shelor | A01G 7/045 47/58.1 LS |
| 2021/0045301 A1* | 2/2021 | Shakoor | H04N 23/54 |

FOREIGN PATENT DOCUMENTS

| | | | | |
|---|---|---|---|---|
| CN | 205232521 U | * | 5/2016 | ........... G01S 17/026 |
| CN | 109442271 A | * | 3/2019 | |
| WO | WO-2022157306 A1 | * | 7/2022 | ............. A01G 31/06 |

OTHER PUBLICATIONS

Translation of CN-109442271-A (Year: 2019).*
Translation of CN-205232521-U (Year: 2016).*

* cited by examiner

Primary Examiner — Renan Luque
(74) Attorney, Agent, or Firm — Theodore M. Magee; Westman, Champlin & Koehler, P.A.

(57) ABSTRACT

A sensing system includes at least one sensor and a movement subsystem configured to move the at least one sensor between a plant and a light source.

11 Claims, 10 Drawing Sheets

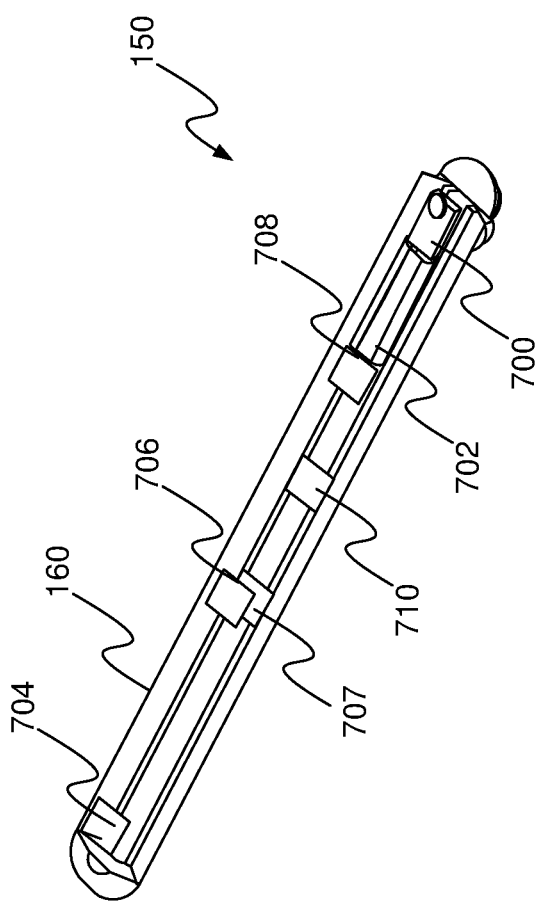
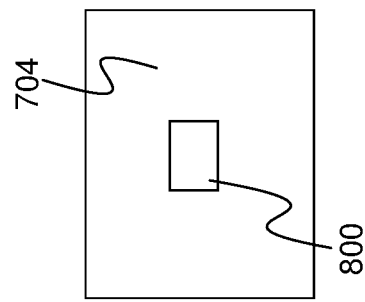
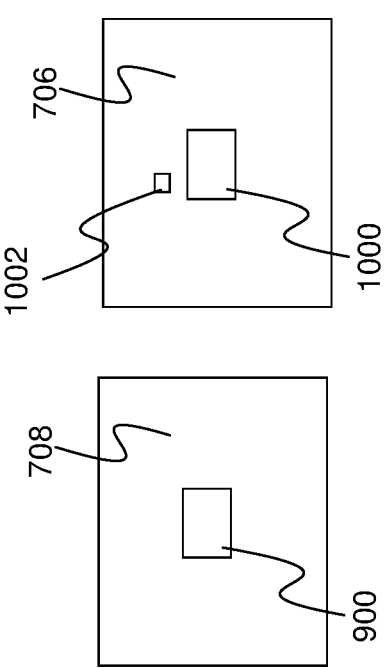
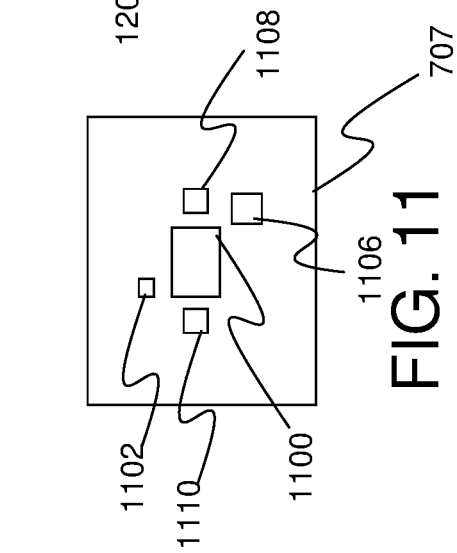
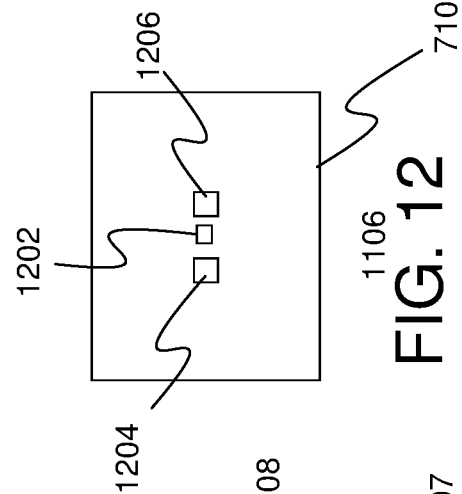
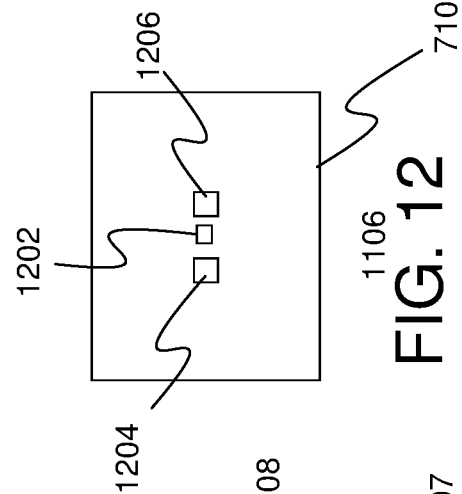

SELF-PROPELLED SENSING SYSTEM FOR GROW OPERATIONS

BACKGROUND

One goal of large-scale indoor farming operations is to maximize yield per square foot of the buildings used in the operation. To achieve this goal, automated watering, feeding, and lighting systems are used to maximize the growth of the plants. In addition, plants are stacked vertically within the facility, thereby increasing the number of plants per square foot. In some systems, lights must be placed between vertically-stacked plant beds to ensure that plants in the lower bed receive enough light.

The discussion above is merely provided for general background information and is not intended to be used as an aid in determining the scope of the claimed subject matter. The claimed subject matter is not limited to implementations that solve any or all disadvantages noted in the background.

SUMMARY

A sensing system includes at least one sensor and a movement subsystem configured to move the at least one sensor between a plant and a light source.

In accordance with a further embodiment, a system includes a rail configured to be located along a bed of plants and a moveable sensor platform, configured to be supported exclusively by the rail and to move along the rail wherein the sensor platform comprises at least one sensor.

In accordance with a still further embodiment, a self-propelled sensing system includes a support interface configured to support the self-propelled sensing system on a structure, a motor configured to move the self-propelled sensing system along the structure, and a plurality of light sensors configured to measure light received from above the self-propelled sensing system and light received from below the self-propelled sensing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is a top perspective view of the sensing system of FIG. 4 with an upper casing along the boom removed and an outer casing of the motor housing removed.

FIG. 8 is a top plan view of a sensor pod.

FIG. 9 is a top plan view of a second sensor pod.

FIG. 10 is a top plan view of third sensor pod.

FIG. 11 is a bottom plan view of the sensor pod of FIG. 10.

FIG. 12 is a bottom plan view of a fourth sensor pod.

DETAILED DESCRIPTION

Monitoring the environment near each plant in an indoor grow operation is critical to optimizing the yield of the grow operation. This includes monitoring conditions such as temperature, humidity, and various spectra of light. In addition, the appearance of each plant must be monitored to detect fungi and disease and to assess the overall growth of the plant.

Placing dedicated environment sensors near each plant is prohibitively expensive in large grow operations. Similarly, having people walk through the facility every hour with sensors to monitor the conditions at each plant is too expensive of a commercial grow operation.

The present embodiments provide a self-propelled sensing system that is supported on and moves along a rail that extends along the length of a plant bed. The sensing system includes a boom that houses a number of sensors. As the sensing system moves along the rail, the boom moves between light sources and the plants in the bed so that the sensors can measure the light arriving at the plants, the light reflected from the plants, and the conditions of the area near the plants.

The sensing system collects the sensor information on periodic basis, such as once per hour. After collecting the sensor data, the sensing system uploads the data to a server using a wireless connection. The sensing system also includes a camera that the sensing system uses to collect photographs of the plants in the plant bed on a periodic basis, such as once a day. The sensing system uploads these photographs to the server through the wireless connection.

Figure 1:
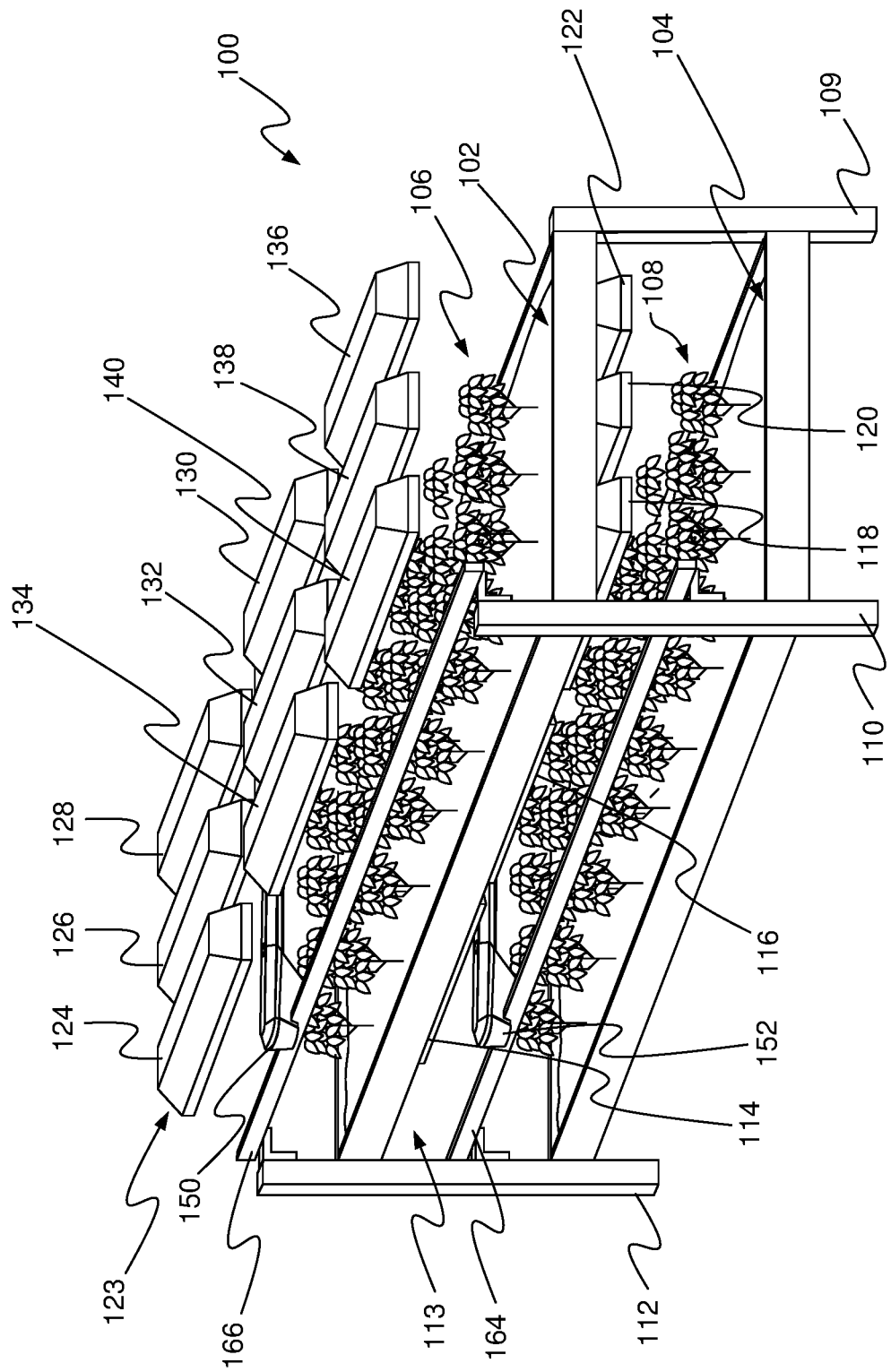
FIG. 1 is perspective view of an indoor grow operation.
Figure 2:
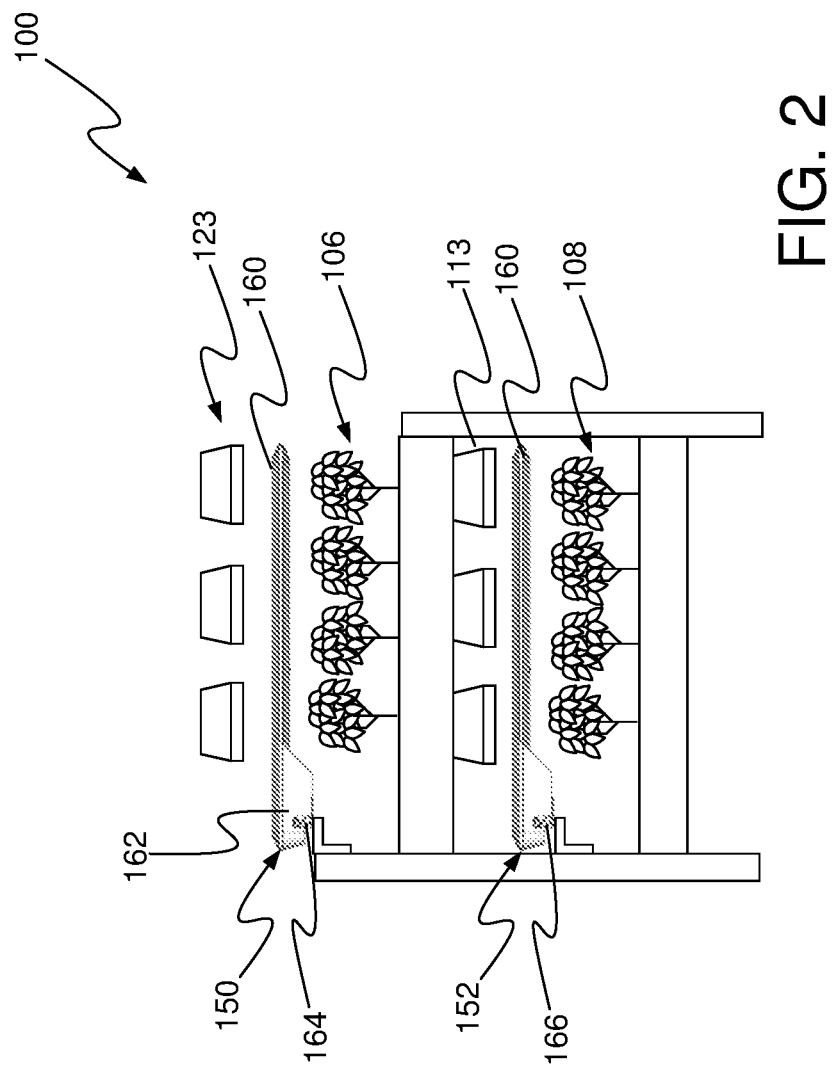
FIG. 2 is an end view of the indoor grow operation of FIG. 1.

FIG. 1 provides a perspective view of a grow operation 100 and FIG. 2 provides a side view of grow operation 100. Grow operation 100 includes two vertically stacked plant beds 102 and 104 that each support a plurality of plants 106 and 108. Plant beds 102 and 104 are supported on a plurality of posts such as posts 109, 110, and 112. Plant beds 102 and 104 include a watering and feeding system, not shown for simplicity. A collection of light sources 113 that includes light sources 114, 116, 118, 120, and 122 are supported on the bottom of plant bed 102. A second collection of light sources 123 that includes light sources 124, 126, 128, 130, 132, 134, 136, 138, and 140 are supported by a separate structure (not shown), which typically consists of a ceiling structure of a building in which grow operation 100 is housed. Grow operation 100 also includes two sensing systems 150 and 152, which are also referred to as movable sensor platforms and self-propelled sensing systems. Each sensing system includes a boom, such as boom 160 and a motor housing, such as motor housing 162. Boom 160 includes a collection of sensor pods discussed further below. Motor housing 162 includes a battery, an integrated circuit board, a motor, and a support interface that support the sensing system on a rail, such as rails 164 and 166.

As shown in FIG. 2, boom 160 of sensing system 150 extends between collection of light sources 123 and plants 106 and boom 160 of sensing system 152 extends between collection of light sources 113 and plants 108. In accordance with one embodiment, boom 160 of sensing systems 150 and 152 is positioned within a meter of the top of the respective plants 106 and 108. This allows the sensors in booms 160 to measure conditions close to the plants in each plant bed.

Figure 3:
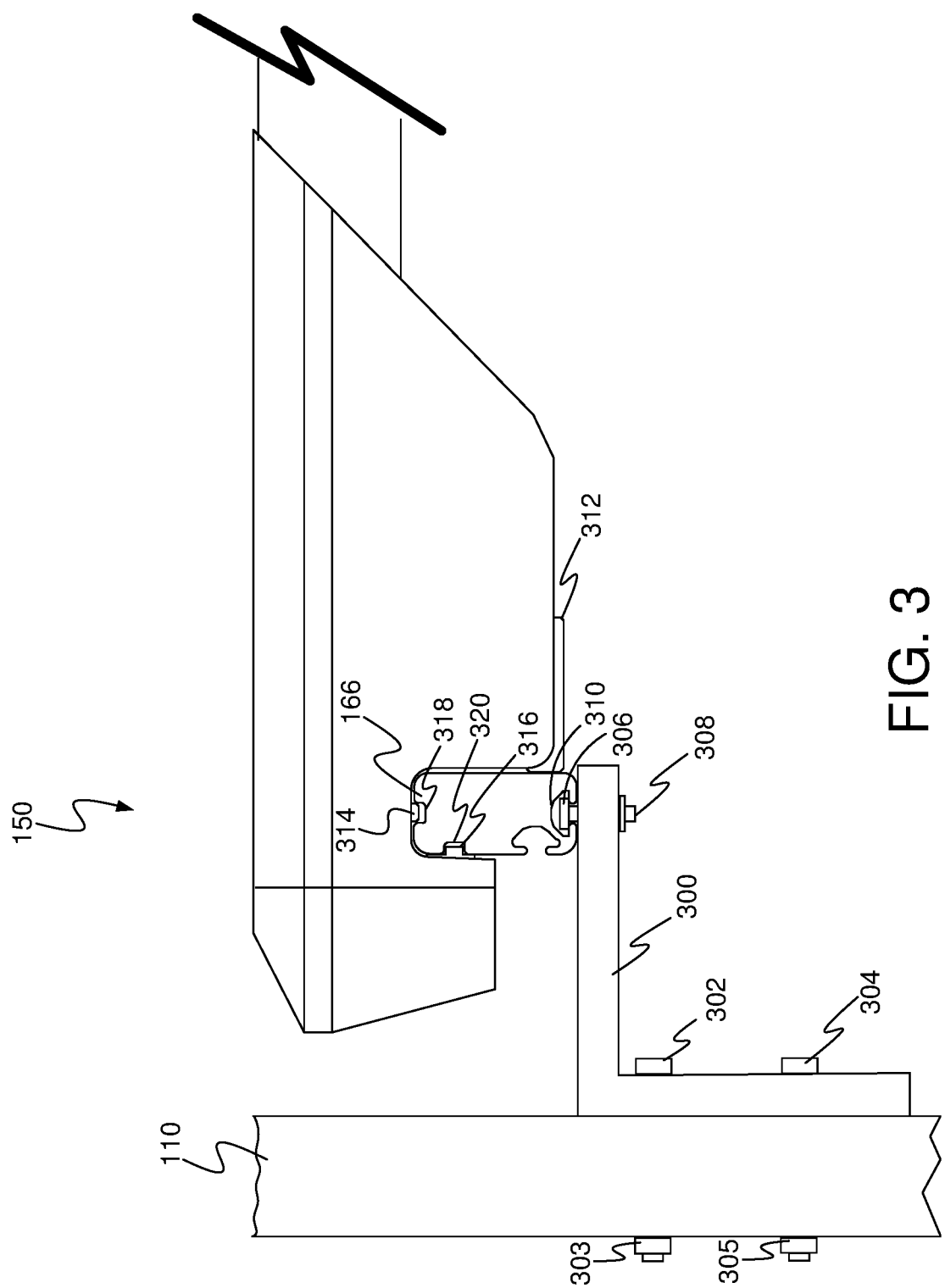
FIG. 3 is an enlarged end view of a portion of the indoor grow operation.

FIG. 3 shows an enlarged side view of motor housing 160, rail 166, and post 110. As shown in FIG. 3, rail 166 is mounted to an L-bracket 300 that in turn is mounted to post 110 using bolt 302 and 304. Rail 166 is mounted to L-bracket 300 using a bolt 306 and a nut 308 with the head bolt 306 placed in a channel 310 of rail 166. In other embodiments, L-bracket 300 is mounted to post 110 using a U-shaped bar that passes around post 110 and through L-bracket 300. Two nuts are then applied to the ends of the U-shaped bar to tighten L-bracket 300 against post 110.

In FIG. 3, the support interface of sensing system 150 is seen to include a drive wheel 312, a top guide 314, and a guide wheel 316. Drive wheel 312 is connected to a motor discussed further below and rotates against rail 166 in order to move sensing system 150 along rail 166. Top guide 314 and guide wheel 316 extend into grooves 318 and 320 in rail 166 and thereby support sensing system 150 on rail 166 such that boom 160 is cantilevered from rail 166. As a result, sensing systems 150 and 152 are only supported on one side allowing for easier installation, lower cost, and easier access to the plants in the plant bed from the side of the plant bed without the rail.

As shown in FIGS. 1-3, sensing system 150 is a moveable sensor platform, configured to be supported exclusively by rail 166 and to move along rail 166. In other words, sensing system 150 is does not require a connection to any element other than rail 166.

As shown in FIGS. 1-3, sensing systems 150 and 152 are supported on the same structure that supports the plant beds. In particular, posts 109, 110, and 122, support beds 102 and 104, and rails 166 and 164, which in turn support sensing systems 150 and 152. By using the same structure to support the plant beds and the support sensing systems, the embodiments create a compact structure for the grow operation thereby improving access to the plants in the plant bed and limiting the amount of square feet taken up by the sensing system. In other embodiments, the rails are supported on posts that are separate from the structure that supports the plant beds.

As sensing systems 150, 152 move along their respective rails, they are positioned over different plants in their respective plant beds and under different sets of lights that are positioned over their plant beds. Since the sensing system is self-propelled, it controls its movement over the plants allowing it to control the linear density of sensor values collected over the plants. In addition, because the sensing system is able to move relative to the plants, when sensing is not being performed, the sensing system can move to a position where it is not between the lights and any particular plant. This ensures that each plant receives as much light as possible when sensing is not taking place.

Figure 4:
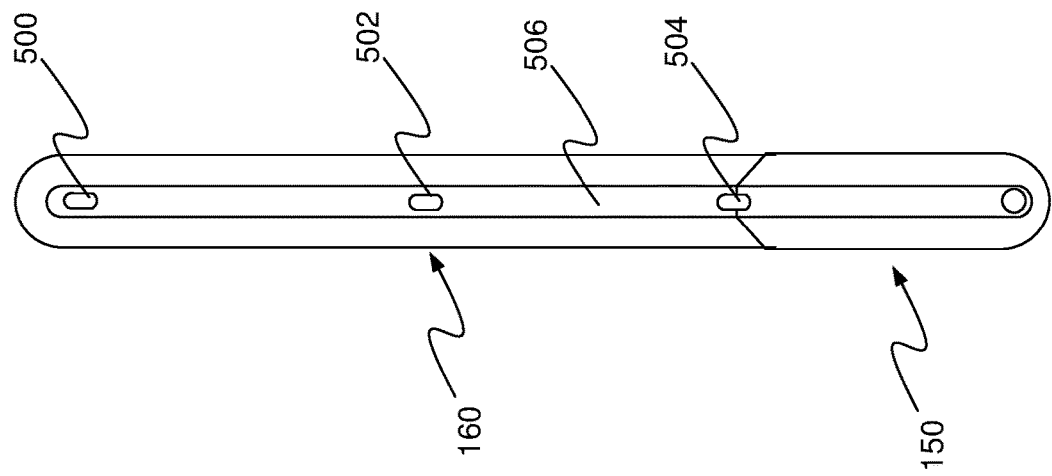
FIG. 4 is bottom view of a sensing system in accordance with one embodiment.
Figure 5:
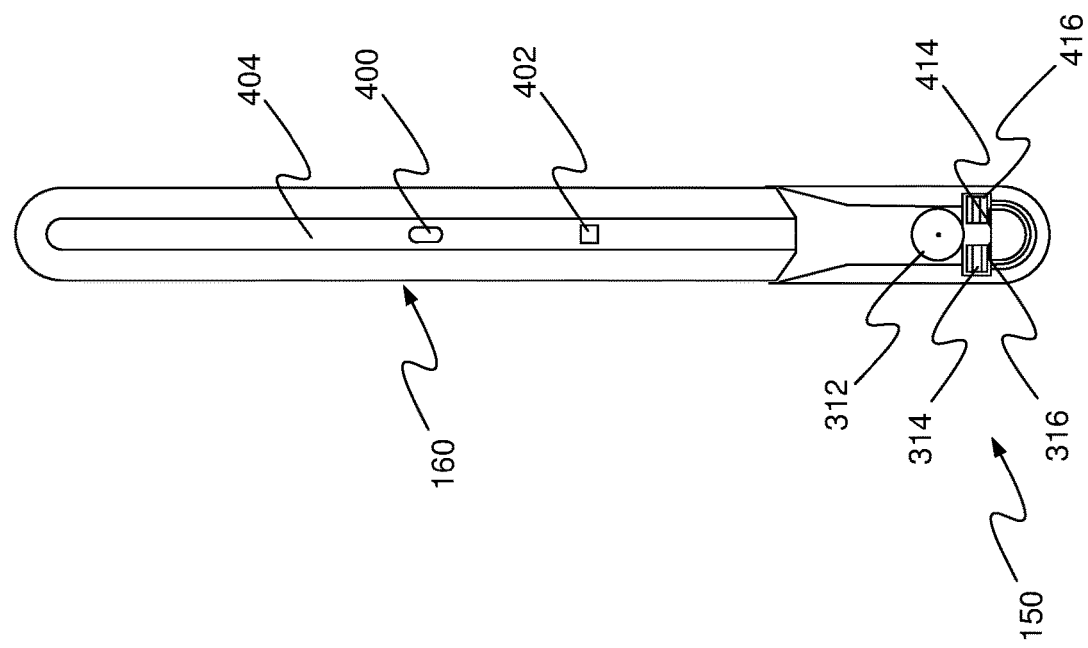
FIG. 5 is a top view of the sensing system of FIG. 4.
Figure 6:
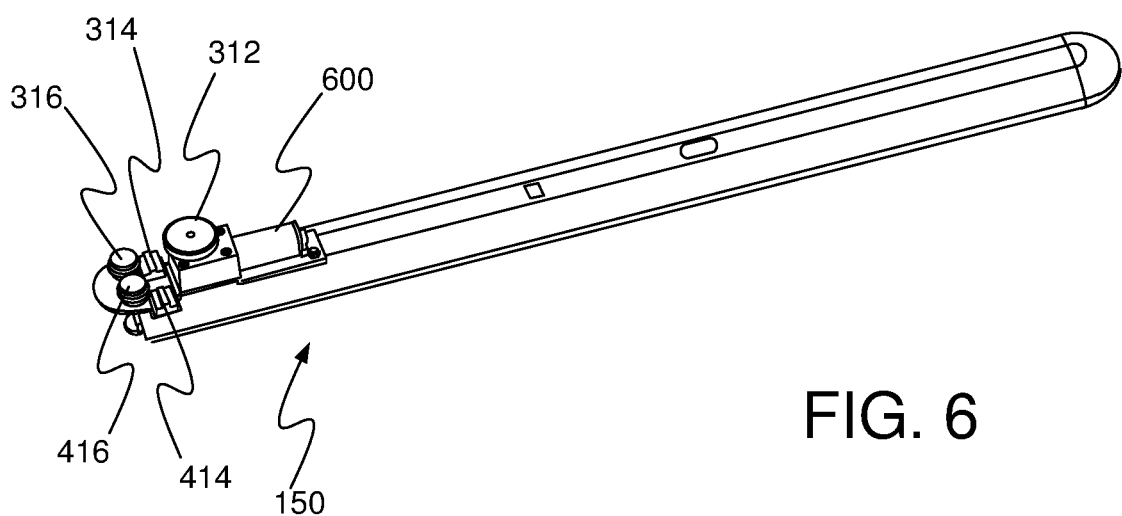
FIG. 6 is a bottom perspective view of the sensing system of FIG. 4 with a casing for the motor housing removed.

FIG. 4 provides a bottom view of sensing system 150. FIG. 5 provides a top view of sensing system 150. FIG. 6 provides a bottom perspective view of sensing system 150 with a casing for the motor housing removed and FIG. 7 provides a top perspective view of sensing system 150 with an upper casing along boom 160 removed and an outer casing of housing 162 removed. Although sensing system 150 is shown in FIGS. 4-7, sensing system 152 is identical to sensing system 150.

As shown in FIGS. 4 and 6, the support interface includes not only drive wheel 312, top guide 314 and guide wheel 316 but also a second top guide 414 and a second guide wheel 416. Top guides 314 and 414 each include a tongue that extends into groove 318 of rail 166. Top guides 314 and 414 also include two downward facing surfaces, one on each side of the tongue, designed to rest on and slide along the top of rail 166.

Guide wheels 316 and 416 include a central portion that extends into groove 320 of rail 166 and two side portions above and below the central portion that engage with a side of rail 166. Guide wheels 316 and 416 are free to spin along their respective central axis and in accordance with one embodiment are not driven by a motor.

Drive wheel 312 is driven by an electric motor 600 shown in FIG. 6. In accordance with one embodiment, motor 600 is an encoded worm drive motor that provides accurate control of the amount of rotation of drive wheel 312. In such motors, magnetic encoders on the shaft of the motor provide an indication of the number of degrees the motor has rotated. This makes it possible to determine how many degrees drive wheel 312 has rotated and to thereby determine the linear movement of sensing system 150.

As shown in FIG. 4, a bottom casing 404 of boom 160 includes to apertures 400 and 402 and as shown in FIG. 5, an upper casing 506 of boom 160 includes three apertures 500, 502, and 504.

As shown in FIG. 7, sensing system 150 also includes an integrated circuit board 700 and an internal battery 702. Integrated circuit board 700 includes electrical components used to control movement of sensing system 150, to collect sensor data and images using sensors and cameras in boom 160, and to transmit the collected sensor data and images to an external server through a wireless connection. Battery 702 provides electrical power to the components of integrated circuit board 700 as well as motor 600 used to move sensing system 150.

As shown in FIG. 7, boom 160 contains five sensor pods 704, 706, 707, 708, and 710. FIG. 8 shows a top plan view of sensor pod 704, FIG. 9 shows a top plan view of sensor pod 708, and FIG. 10 shows a top plan view of sensor pod 706. In FIGS. 8, 9, and 10, sensor pods 704, 708, and 706 are shown to contain respective upward facing multispectral light sensors 800, 900, and 1000. In accordance with one embodiment, light sensors 800, 900, and 1000 are identical to each other and each is capable of measuring the intensity of various bands of light including bands in the visible spectrum, the ultraviolet spectrum, and the infrared spectrum. In FIG. 10, sensor pod 706 is shown to also include a deep ultraviolet sensor 1002 that senses light in a deep ultraviolet bandwidth.

FIG. 11 shows a bottom plan view of sensor pod 707, which contains a downward facing light sensor 1100 that is identical to upward facing light sensor 1000 on the top of sensor pod 706 but faces downward instead of upward. Sensor pod 707 also contains a deep ultraviolet sensor 1102 that is identical to deep ultraviolet sensor 1002, a range finder 1108 that measures the distance between sensor pod 707 and the top of the plant canopy directly below boom 160, a downward facing infrared sensor 1110 that measures the intensity of particular bands of infrared light, and a camera 1106 that is able to capture an image of the plants below boom 160.

FIG. 12 is a bottom plan view of sensor pod 710 and shows that sensor pod 710 includes a $CO_2$ sensor 1202 that measure carbon dioxide, a humidity sensor 1204 that measures the relative humidity in the space immediately adjacent to boom 160, and a temperature sensor 1206 that measures the temperature of the space immediately adjacent to boom 160.

Figure 13:
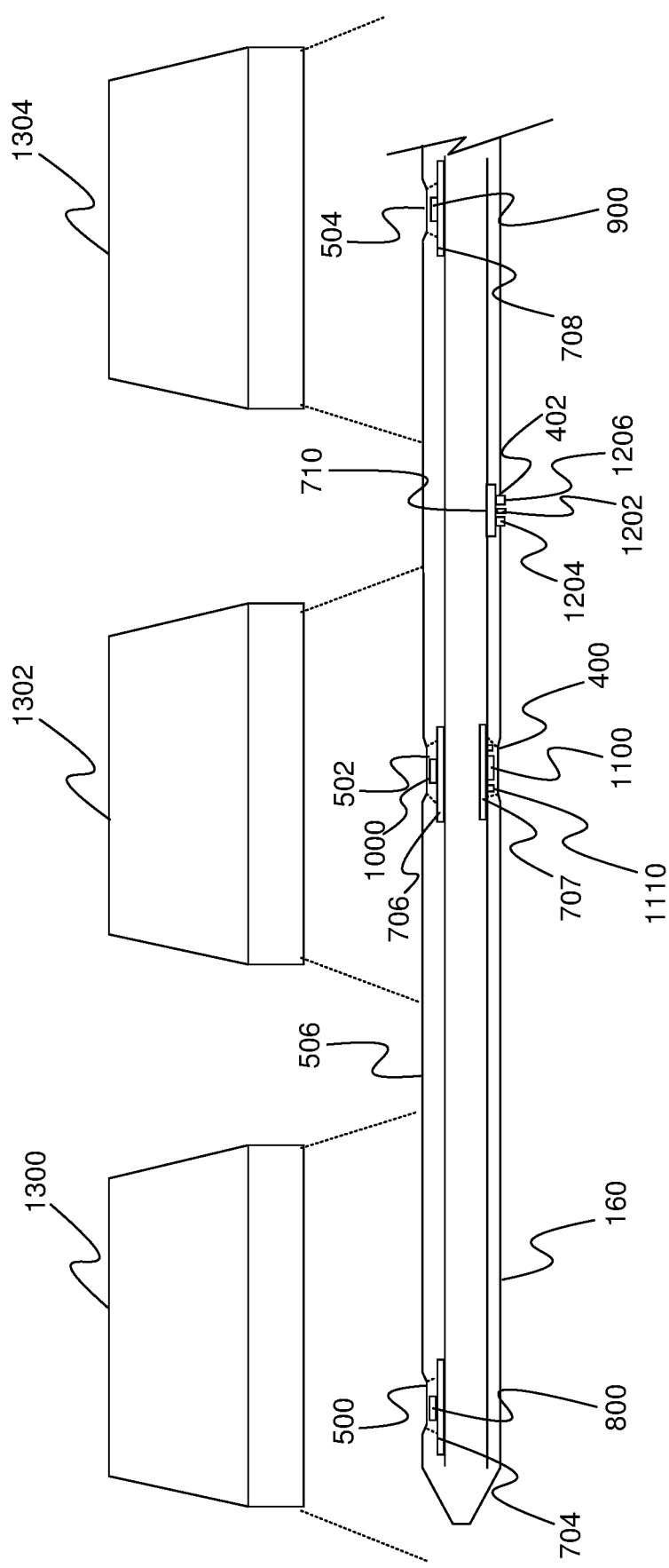
FIG. 13 is a cutaway view of a boom beneath three light sources.

FIG. 13 shows a cutaway view of boom 160 beneath three light sources 1300, 1302, and 1304. As shown in FIG. 13, apertures 500, 502, and 504 in boom case 506 allow light from light sources 1300, 1302, and 1304 to reach light sensors 800, 900, and 1000 on sensor pods 704, 708, and 706 as well as deep ultraviolet sensor 1002 on sensor pod 706. In particular, light from light source 1300 is received by light sensor 800 on sensor pod 704, light from light source 1302 is received by light sensor 1000 on sensor pod 706 and light from light source 1304 is received by light sensor 900 on sensor pod 708. As a result, each light sensor 800, 900, and 1000 provides information about the amount of light provided by a respective light source. This allows sensing system 150 to detect when a particular light source is not providing optimal lighting for plant growth. For example, if light source 1302 were providing less than a desired amount of light in a particular frequency band, the light received at sensor 800 of sensor pod 706 would be less than the light received at light sensors 900 and 1000. This would allow an operator to determine that light source 1302 needs to be repaired or replaced. Note that the deficiency in a light source may not be apparent to a person since the deficiency may be at a frequency band that cannot be detected by the human eye.

As shown in FIG. 13, aperture 400 in the lower casing of boom 160 allows light reflected from the plants to reach downward facing light sensor 1100 and downward facing deep ultraviolet sensor 1102. The intensity of the reflected light measured by downward facing light sensor 1100 in combination with the intensity of the light detected by upward facing light sensors 800, 900, and 1000 provides a means to detect what light is being absorbed by the plants. In particular, for each bandwidth of light of interest, a difference in intensity can be determined between the light that is received by light sensors 800, 900, and 1000 and the reflected light that is received by light sensor 1100. Similarly, a difference in the intensity of deep ultraviolet light sensed by upward facing deep ultraviolet sensor 1002 and the intensity of deep ultraviolet light sensed by downward facing deep ultraviolet sensor 1102 can be determined. The differences can then be compared to each other. Bandwidths with larger differences are considered to have been absorbed by the plant more than bandwidths with smaller differences.

Infrared light emitted by the plants is also received by infrared sensor 1110 through aperture 400. The received infrared light can be used to estimate the temperature of the plants which in turn can be used to determine Vapor Pressure Deficiency, an important growing metric.

As shown in FIG. 13, $CO_2$ sensor 1202, humidity sensor 1204 and temperature sensor 1206 extend out of an opening 402 in boom 160 so that these sensors are able to measure the $CO_2$ level, humidity level and temperature outside of boom 160 at the current position of boom 160. In accordance with one embodiment, a seal is provided between pod 710 and the portion of boom 160 around opening 402 so as to limit the amount of external air and moisture that reaches the interior of boom 160.

Together, circuit board 700, motor 600, and drive wheel 312 form a movement subsystem configured to move the sensors and camera in boom 160 between the plants and the light sources.

Figure 14:
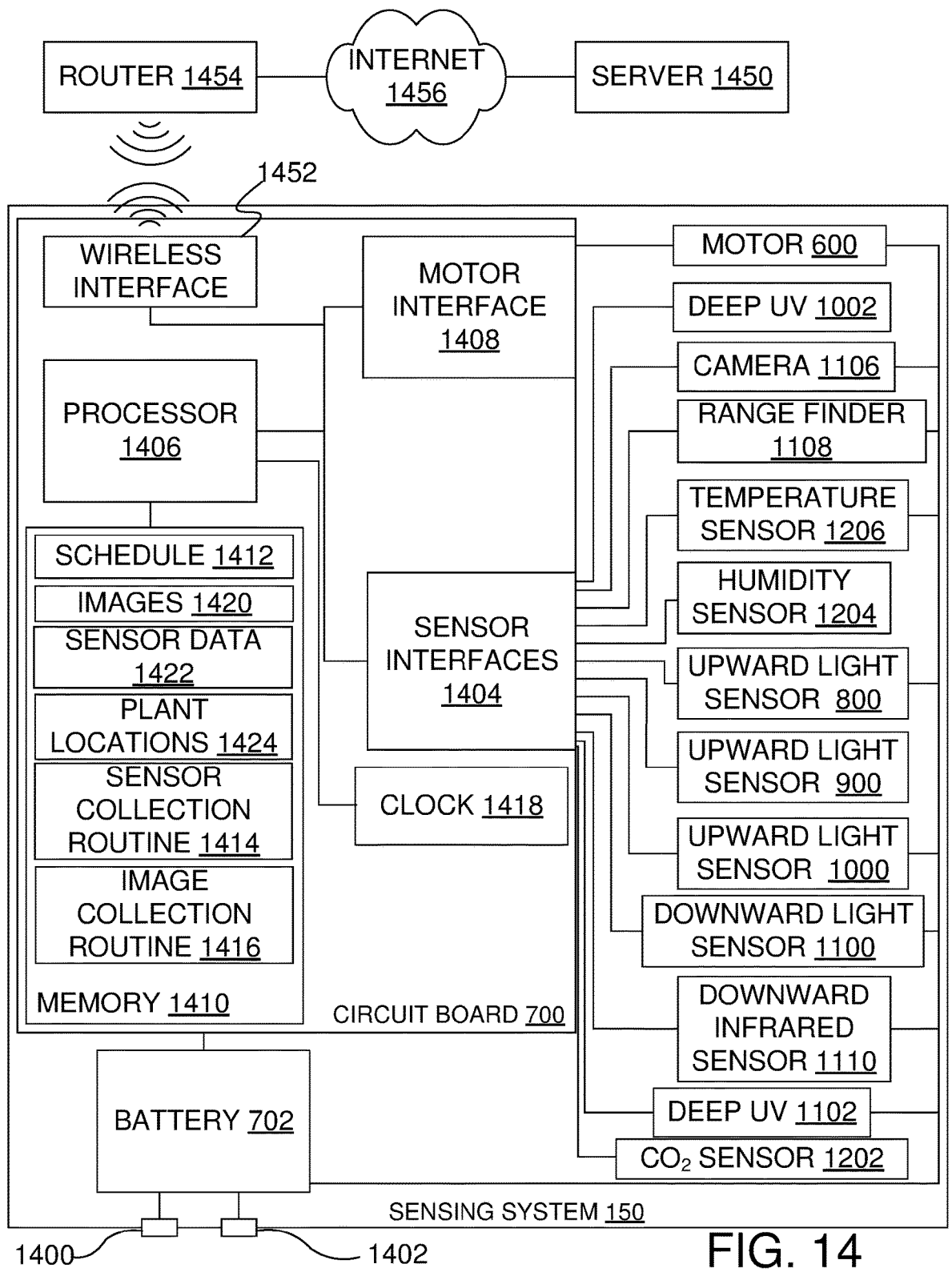
FIG. 14 is a block diagram of electronics in a sensing system.

FIG. 14 provides a circuit diagram of the electrical components in sensing system 150. As shown in FIG. 14, battery 702 provides power to circuit board 700 and each of motor 600, camera 1106, range finder 1108, temperature sensor 1206, humidity sensor 1204, upward facing light sensors 800, 900, and 1000, upward facing deep ultraviolet sensor 1002, downward facing light sensor 1100, downward facing infrared sensor 1110, downward facing deep ultraviolet sensor 1102, and $CO_2$ sensor 1202. Battery 702 includes two external contacts 1400 and 1402 that are used to recharge battery 702 when sensing system 150 has positioned itself at a docking station. Circuit board 700 includes a collection of sensor interfaces 1404 that are connected to camera 1106, range finder 1108, temperature sensor 1206, humidity sensor 1204, upward facing light sensors 800, 900, 1000, upward facing deep ultraviolet sensor 1002, downward facing light sensor 1100, downward facing infrared sensor 1110, downward facing deep ultraviolet sensor 1102, and $CO_2$ sensor 1202. Sensor interfaces 1404 receive data from the sensors and cameras and provide that data to a processor 1406. Processor 1406 is further connected to a motor interface 1408, which is further connected to motor 600. Motor interface 1408 receives instructions from processor 1406 to actuate motor 600 and based on the instructions applies current pulses to motor 600 so as turn motor 600 a desired number of degrees.

Processor 1406 is also connected to a memory 1410 which contains a schedule 1412, a sensor collection routine 1414 and an image collection routine 1416. Schedule 1412 indicates when sensor collection routine 1414 should be executed and when image collection routine 1416 should be executed. Processor 1406 uses a time provided by a clock 1418 and scheduled times provided by schedule 1412 to determine when to execute sensor collection routine 1414 and image collection routine 1416.

Memory 1410 also includes images 1420 collected by camera 1106 and sensor data 1422 collected by range finder 1108, temperature sensor 1206, humidity sensor 1204, upward facing light sensors 800, 900, 1000, upward facing deep ultraviolet sensor 1002, downward facing light sensor 1100, downward facing infrared sensor 1110, downward facing deep ultraviolet sensor 1102, and $CO_2$ sensor 1202 at different locations. In accordance with one embodiment, as images and sensor data are received from sensor interfaces 1404 they are stored in memory 1410 together with identifying information such as the time and date at which the images/sensor data were received and the position of the boom along the rail when the sensor data/images were received.

In accordance with one embodiment, memory 1410 also includes a collection of plant locations 1424 that indicate the position of plants within the plant bed. Plant locations 1424 may be entered by hand or may be determined from images collected by camera 1306.

Processor 1406 is in wireless communication with a server 1450 through a wireless interface 1452 and a router 1454. In particular, wireless interface 1452 communicates wirelessly with router 1454, which routes data packets provided by processor 1406 to server 1450 through the internet 1456. Using this communication link, processor 1406 is able to forward images 1420 and sensor data 1422 to server 1450 and is able to receive instructions from server 1450 including changes to sensor collection routine 1414 and changes to image collection routine 1416 as well as changes to schedule 1412.

Figure 15:
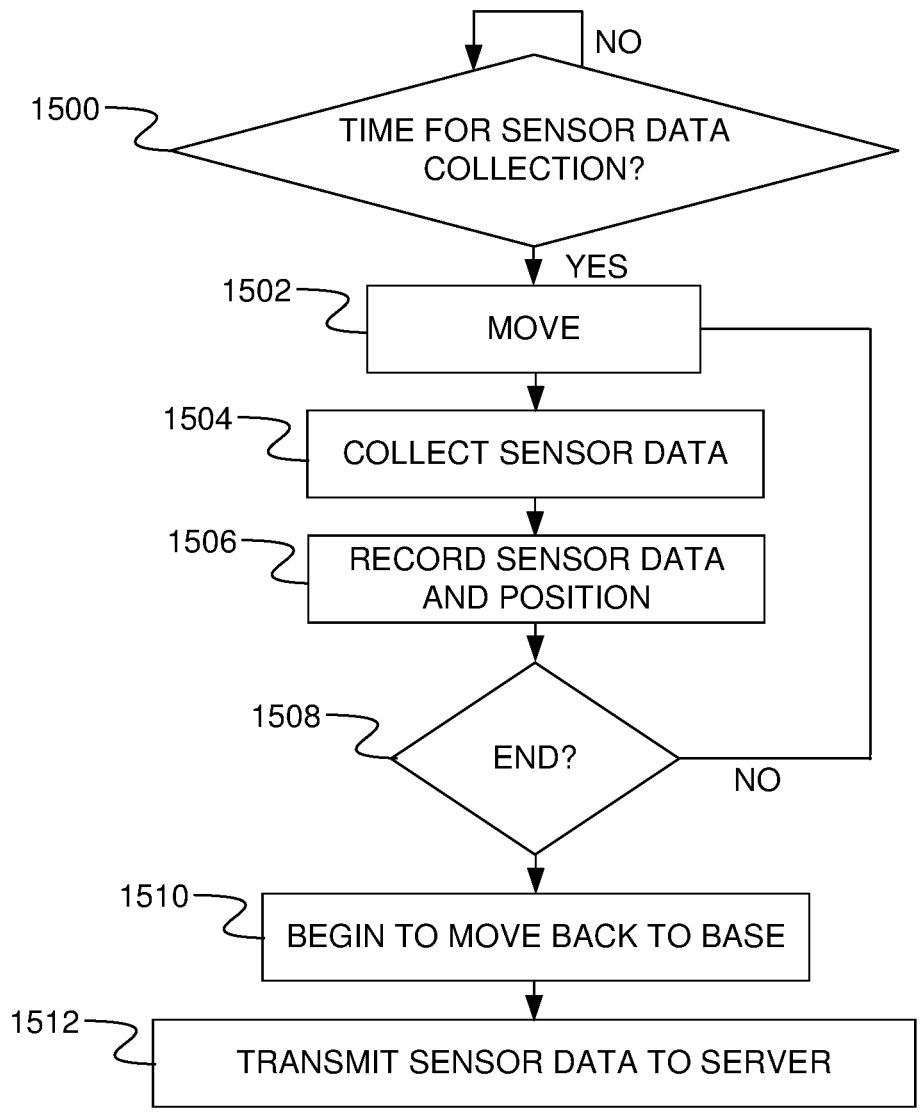
FIG. 15 is a flow diagram of a method of collecting data.

FIG. 15 provides a flow diagram of a method performed when executing sensor collection routine 1414. At step 1500, processor 1406 determines if it is time for sensor data collection. This can be determined from schedule 1412, which indicates times when data collection is to take place, and clock 1418, which indicates the current date and time. Additionally, or alternatively, processor 1406 can determine that it is time for sensor data collection based on an external command received through wireless interface 1452 that requests that sensor data be collected. The external command can be received from server 1450 or from another device that is in wireless communication with processor 1406. If it is not time for data collection, processor 1406 waits for the scheduled time and/or for a command to be received.

When the time for data collection arrives, processor 1406 instructs motor 600 to turn drive wheel 312 so as to place boom 160 at a desired position set in sensor collection routine 1414. When boom 160 arrives at the desired location, processor 1406 collects sensor data from range finder 1108, temperature sensor 1206, humidity sensor 1204, upward facing light sensors 800, 900, 1000, upward facing deep ultraviolet sensor 1002, downward facing light sensor 1100, downward facing infrared sensor 1110, downward facing deep ultraviolet sensor 1102, and $CO_2$ sensor 1202.

At step 1506, processor 1406 stores the sensor data as sensor data 1422 in memory 1410 along with the position along the plant bed where the data was collected and the time and date at which the data was collected. At step 1508, processor 1406 determines if the sensing system has reached the end of the plant bed. If the sensing system has not reached the end of the plant bed, processor 1406 sends an instruction through motor interface 1408 to motor 600 to cause the motor to rotate the drive wheel so that the sensing system moves laterally along the rail. Steps 1504, 1506, and 1508 are then repeated at the new position along the rail.

When the sensing system reaches the end of the plant bed, processor 1406 sends an instruction to motor 600 to return the sensing system to a docking station at step 1510. While motor 600 is turning drive wheel 312 to cause sensing system 150 to return to the docking station, processor 1406 transmits sensor data 1422 to server 1450 through wireless interface 1452, router 1454, and internet 1456 at step 1512. Processor 1406 then waits until it is once again time for sensor data to be collected. In accordance with one embodiment, sensor data is collected once per hour.

Figure 16:
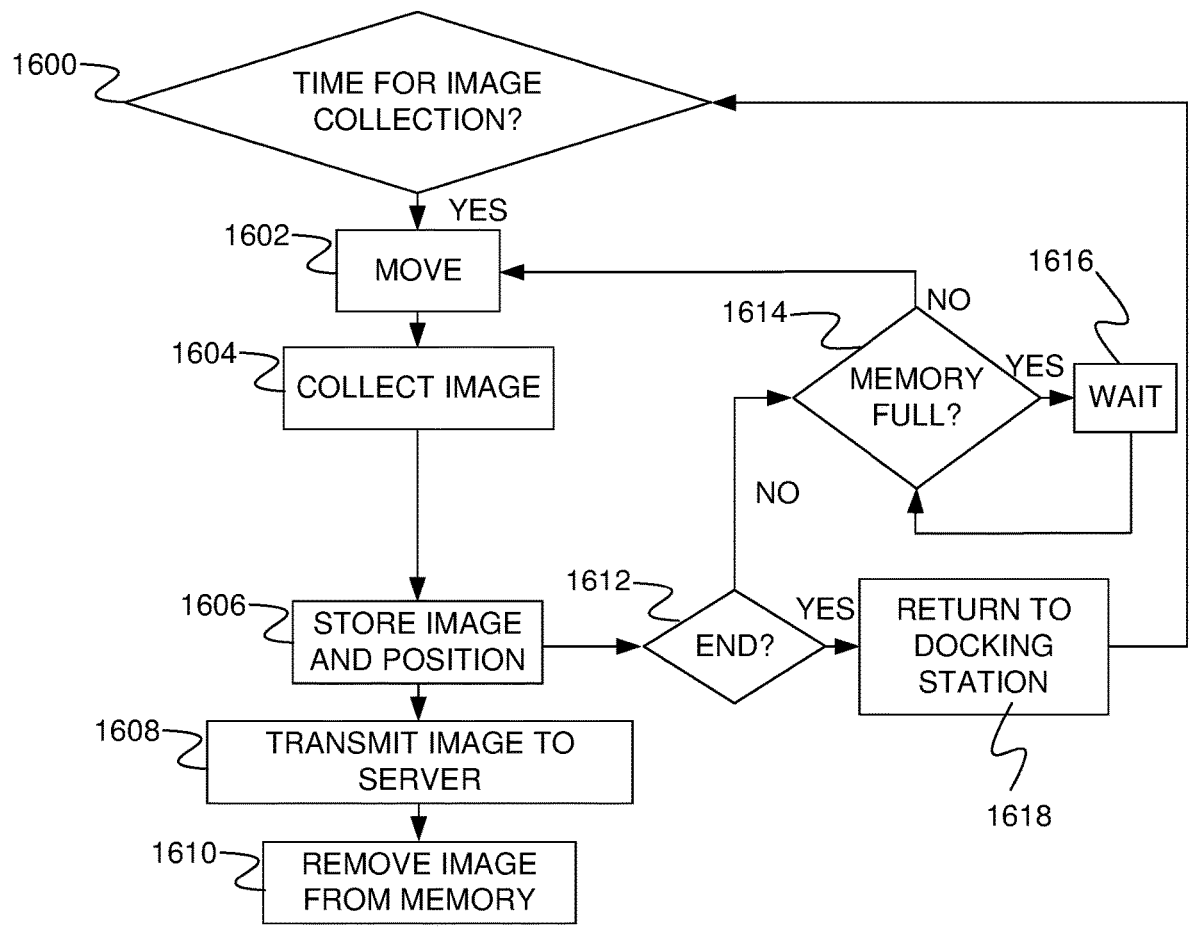
FIG. 16 is a flow diagram of a method of collecting images.

FIG. 16 provides a flow diagram of a method executed by processor 1406 when performing image collection routine 1416.

At step 1600, processor 1406 determines it is time for image collection. This can be determined from schedule 1412, which indicates times when images are to be collected, and clock 1418, which indicates the current date and time. Additionally, or alternatively, processor 1406 can determine that it is time for image collection based on an external command received through wireless interface 1452 that requests that images be collected. The external command can be received from server 1450 or from another device that is in wireless communication with processor 1406.

When it is time for image collection, processor 1406 sends an instruction to motor 600 to cause it to rotate sufficiently to move to an image capture position at step 1602. At step 1604, processor 1406 sends an instruction to camera 1106 to collect an image of the plant bed. In accordance with one embodiment, camera 1106 uses a distance provided by range finder 1108 in order to focus the camera on the plants in the plant bed. At step 1606, processor 1406 stores the image provided by camera 1306 in images 1420 of memory 1410. In accordance with one embodiment, processor 1406 also stores metadata for each image including the position of the boom when the image was captured and the date and time when the image was captured.

At step 1608, processor 1406 immediately begins to transmit the image to server 1450 through wireless interface 1452. Once the image has been fully transmitted, the image is removed from memory by processor 1406 at step 1610.

While the image is being transmitted, processor 1406 also determines whether sensing system 150 has reached the last image capture position along the plant bed at step 1612. If sensing system 150 has not reached the last image capture position, processor 1406 determines if memory 1410 is full at step 1614. In accordance with one embodiment, processor 1406 will consider memory 1410 to be full when it does not have sufficient space to accept another image. If memory 1410 is full, processor 1406 waits at step 1616 for a period of time and then redetermines if the memory is full. As images are transmitted to server 1450 and removed at step 1610, the memory will acquire more free space.

When the memory is no longer full at step 1614, the process returns to step 1602 and processor 1406 moves sensing system 150 to the next image capture position. Steps 1604, 1606, 1608, 1610, 1612, 1614, and 1616 are then repeated at the new image capture position.

When sensing system 150 has reached the last image capture position at step 1612, processor 1406 instructs motor 600 to turn sufficiently to drive sensing system 150 back to the docking station at step 1618. Processor 1406 then waits for the next time for image collection at step 1600. In accordance with one embodiment, images are collected once per day.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A sensing system comprising:
   an upward-facing light sensor;
   a downward-facing light sensor;
   a movement subsystem configured to move the upward-facing light sensor between a plant and a light source;
   wherein the upward-facing light sensor receives light from the light source and wherein the downward-facing light sensor that receives light reflected from the plant.

2. The sensing system of claim 1 wherein in the plant is supported by a structure and the movement subsystem is supported by the structure.

3. The sensing system of claim 2 wherein the movement subsystem is supported by a rail that in turn is supported by the structure.

4. The sensing system of claim 1 wherein the movement subsystem comprises a motor that moves with the at least one sensor.

5. The sensing system of claim 1 wherein the movement subsystem is configured to move the upward-facing light sensor between the plant and multiple light sources and wherein the sensing system further comprises a second upward-facing light sensor and a third upward-facing light sensor that each receive light from a respective light source of the multiple light sources.

6. The sensing system of claim 1 wherein the sensing system further comprises a temperature sensor for sensing a temperature of air at the sensing system and an infrared light sensor for sensing the temperature of the plant.

7. The sensing system of claim 1 wherein the sensing system further comprises a carbon dioxide sensor.

8. The sensing system of claim 1 wherein the sensing system further comprises a range finder for detecting a distance between the plant and the range finder.

9. The sensing system of claim 1 wherein the movement subsystem is configured to move the upward-facing light sensor between a bed containing multiple plants and a plurality of light sources.

10. A self-propelled sensing system comprising:
   a support interface configured to support the self-propelled sensing system on a structure;
   a motor configured to move the self-propelled sensing system along the structure; and
   a boom extending from the support interface and comprising:
      a plurality of upward-facing light sensors configured to measure light received from above the self-propelled sensing system; and
      a downward-facing light sensor configured to measure light received from below the self-propelled sensing system.

11. The self-propelled sensing system of claim 10 further comprising a temperature sensor and an infrared sensor.

\* \* \* \* \*